R. W. HARTNETT.
Milling Machine for Dressing Printers' Chases.
No. 201,780. Patented March 26, 1878.
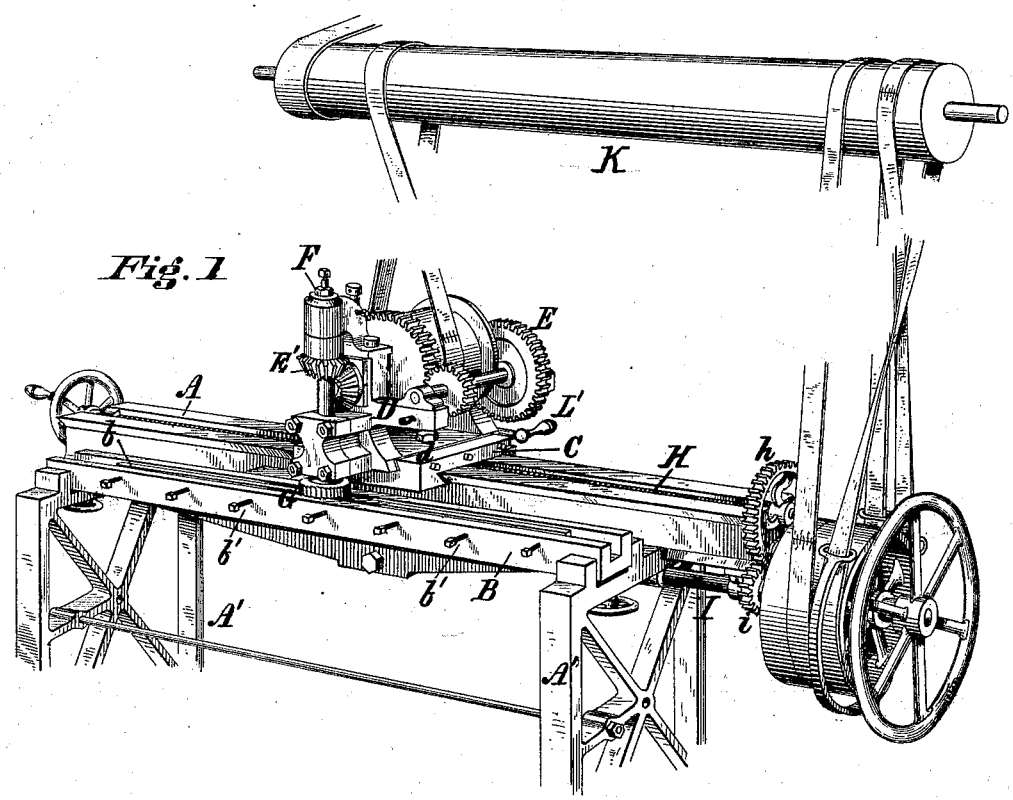
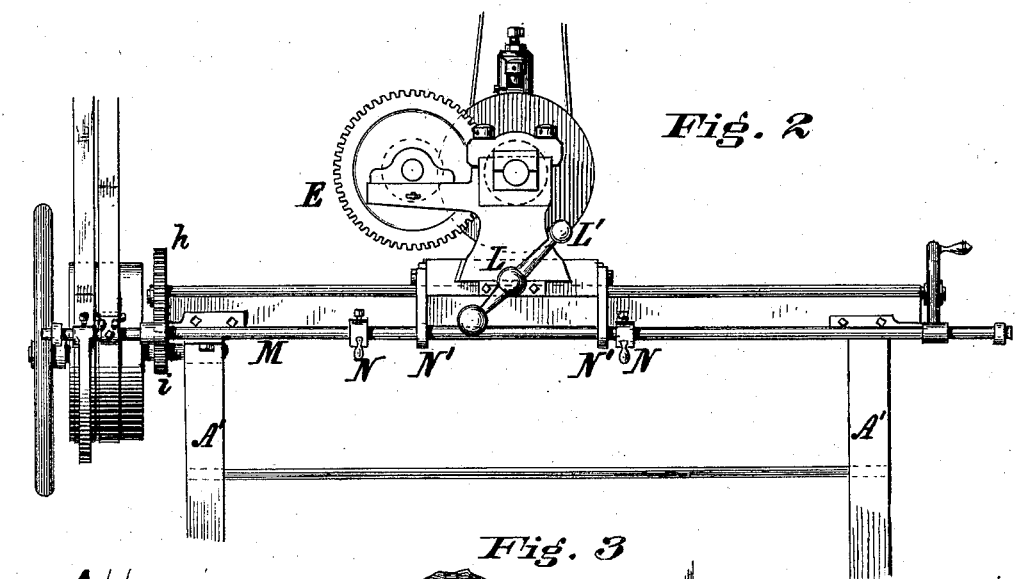
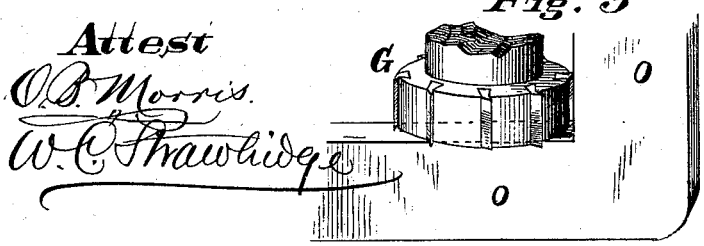
Attest
O. B. Morris
W. C. Shawhidge
Inventor
Richard W. Hartnett
By his Attorney
J. Bonsall Taylor

UNITED STATES PATENT OFFICE.

RICHARD W. HARTNETT, OF PHILADELPHIA, PENNSYLVANIA.

IMPROVEMENT IN MILLING-MACHINES FOR DRESSING PRINTERS' CHASES.

Specification forming part of Letters Patent No. 201,780, dated March 26, 1878; application filed August 31, 1877.

*To all whom it may concern:*

Be it known that I, RICHARD WILLIAM HARTNETT, of the city and county of Philadelphia, in the State of Pennsylvania, have invented a new and useful Improvement in Milling-Machines for Dressing Printers' Chases, of which I do hereby declare the following to be a full, clear, and precise description, and sufficient to enable those skilled in the art to which it appertains to construct and employ my said invention, reference being had to the accompanying drawing, which forms part of this specification, and of which—

Figure 1 is a view, in perspective, of my improved machine; Fig. 2, an elevation of the same, looking from behind; and Fig. 3, a detail of the cutter, illustrating my method of dressing out thereby the corners of the chase, in place upon which latter the cutter is represented.

Similar letters of reference indicate corresponding parts wherever used.

My invention relates to the class of milling-machines which are employed to dress up printers' chases.

The following is a description of a convenient form of machine embodying my invention.

A are the shears or ways upon which the carriage, head, and cutting mechanism travel longitudinally. A' A' are the legs or frame-work supporting the machine. B is the chuck or chase-supporter, provided with an adjustable clamping-block and set-screws $b$ $b'$, to adapt it to retain the chase in any given position, and so constructed as to support an upright chase in position beneath the cutter in the dressing of the corners, or being of any other fit construction to support a chase.

C is the carriage, actuated by the proper gearing, whereof hereinafter, to any required longitudinal reciprocation, and provided with and carrying the head and cutting mechanism. D is the head, traveling transversely in ways $d$ on the carriage, and actuated to the required extent for dressing across the corners of the chase by means of a cross-feed screw, L, and hand-wheel L' on the carriage engaging with a nut beneath said head. E is an ordinary back gear upon the head, to impart the requisite speed to a bevel-gear, E', driving the vertical spindle F, to the bottom extremity of which is fixed a horizontal cutter, G, which latter is provided upon its sides and base with fixed teeth, or with insertible teeth, as shown in Fig. 3. The cutter is of right-angular configuration at its base, to enable the perfect dressing of the corners of the chase.

I is the driving-shaft, to which is keyed a pinion, $i$, meshing with a gear-wheel, $h$, connected with the carriage-actuating screw H. To the driving-shaft are also secured one tight and two loose pulleys, which carry a straight and cross belt, their action in driving or reversing the screw H being regulated by the action of the belt-shifter rod M and its stop-dogs N N, which encounter lugs N' N' on the carriage, all substantially in the manner usual in planing-machines, and forming no part of my invention. O in Fig. 3 is the chase.

K is a driving-drum, imparting through belts motion to the back gear of the head and to the driving-shaft.

Such being the construction of my machine, the following is its operation: The chase in its undressed condition being secured in the desired position in the chuck, motion is imparted to the entire machine, and the carriage, head, and revolving cutter caused to travel from end to end of that side of the chase which is set to be dressed, the position of the dogs N N of the belt-shifter rod M being made correspondent to the length of the side to be dressed, in order to secure reversing at the proper time. The base of the cutter in its longitudinal throw trues that inner side of the chase which is exposed. When the length of the side has been thus dressed and the corner reached, transverse motion is imparted to the cutter by means of the hand-wheel L' and its cross-feed screw, and the cutter driven across the corner and then retracted, so as to dress across the corner, after which the chase is reset, another side exposed, and the operation repeated in the same manner until the whole has been dressed.

It is obvious that the most complete dressing of every portion of the chase is effected by the machine without the need of any hand-finishing. I have specified a hand-wheel, L', as a convenient means of transversely operating the cutter; but it will be readily understood that any automatic mechanism adapted to effect the required reciprocation may be substituted therefor.

Having thus described my invention, I claim and desire to secure by Letters Patent of the United States—

In combination with the carriage C, when adapted, by means of the screw H and its actuating mechanism, to be reciprocated longitudinally upon the shears A in relation to the chuck B, the head D, when provided with the back gear E, bevel-gear E', spindle F, and cutter G, and adapted, by means of the cross-feed screw L, to be reciprocated transversely upon the carriage C in relation to the chuck B, substantially as shown and described, and for the purpose specified.

In testimony whereof I have hereunto signed my name in the presence of two witnesses.

RICHARD W. HARTNETT.

Witnesses:
    J. BONSALL TAYLOR,
    W. C. STRAWBRIDGE.